US006955090B2

(12) United States Patent
Wilson

(10) Patent No.: US 6,955,090 B2
(45) Date of Patent: Oct. 18, 2005

(54) CYLINDER PRESSURE TRANSDUCER AND RELATED METHOD

(75) Inventor: Ronald Wayne Wilson, South Lake Tahoe, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/707,097

(22) Filed: Nov. 20, 2003

(65) Prior Publication Data

US 2005/0109114 A1 May 26, 2005

(51) Int. Cl.$^7$ ................................................ G01L 7/08
(52) U.S. Cl. .............................. 73/715; 73/753; 73/756
(58) Field of Search .................................. 73/700–756

(56) References Cited

U.S. PATENT DOCUMENTS

| 4,321,578 A | | 3/1982 | Nagasu et al. | |
| 4,530,029 A | * | 7/1985 | Beristain | ................. 361/283.4 |

(Continued)

FOREIGN PATENT DOCUMENTS

| JP | 62177192 A | * | 8/1987 | ............ C25D/1/02 |

OTHER PUBLICATIONS

"Why choose Pressure?" —http://web.archive.org/web/20020312194406/http://www.psm–sensors.co.uk/support/App5.htm.*
"ASHCROFT® Pressure & Temperature Instrumentation," Duragauge® Pressure Gauges, May 16, 2001; www.ashcroft.com.
"IQS Pressure Transducers," 2003; www.pressure–transducers.net.
"VRP Transducers for Low–Pressure Measurement," 1991, wwwCelesco/pressuretransducers.html.
ASHCROFT Model A2 General Industrial, Explosion Proof and Sanitary Pressure Transmitter, brochure, Sep. 2002.
Rugged Wet/Wet Differential Pressure Transducer with 316SS/Hastelloy Wetted Parts, advertisement, not dated.
"Gentran—Plastic Melt Pressure Transducer Model GT100," ISE, Inc. brochure, not dated.
"Honeywell Precision Transducer—Explosion Proof," brochure, Jan. 2003.
RDP Group "Model CIP Sanitary Flange Precision Flush Diaphragm/Gauge Pressure/Absolute Pressure Transducer," www.rdpe.com/pressure/cip.htm., not dated.
"ASHCROFT Pressure Transducer Model KXF, KXF (Exi), KXFHT," brochure, Feb. 2003.
Omega.nl PX821 Rugged Wet/Wet Differential Pressure Transucer with 316SS/Hastelloy Wetted Parts, www.omega.nl/ppt/ppt_nl.asp., not dated.
"Series 8 Piezoresistive OEM Pressure Transducers," Sep. 2003 brochure, Omni Instruments, Apr. 1999.
"Model EJA430A Gauge Pressure Transmitter," Jun. 1997 brochure, Yokogawa.
Reciprocating Compressor Solutions, RECIP Solutions brochure, not dated.

*Primary Examiner*—William Oen
*Assistant Examiner*—Jermaine Jenkins
(74) *Attorney, Agent, or Firm*—Nixon & Vanderhye, P.C.

(57) ABSTRACT

A pressure transducer for a hydrogen reciprocating compressor in a sour gas environment includes a sensor head including a diaphragm mounted on a free end of the sensor head. The diaphragm is constructed of a nickel-based alloy with gold plating on an exposed side thereof. A method of monitoring line pressure in a reciprocating hydrogen compressor in a sour gas environment includes a) providing a pressure transducer having a sensor head and a diaphragm located flush with a free end of the sensor head composed of a nickel-based alloy; b) applying a noble metal plating to one side of the diaphragm; and c) mounting the pressure transducer in a reciprocating compressor with the one side exposed to the sour gas.

17 Claims, 1 Drawing Sheet

U.S. PATENT DOCUMENTS

| | | | |
|---|---|---|---|
| 4,670,733 A | | 6/1987 | Bell |
| 5,069,759 A | * | 12/1991 | Hodate .................. 205/73 |
| 5,134,887 A | | 8/1992 | Bell |
| 5,224,383 A | * | 7/1993 | Pinto et al. ............... 73/706 |
| 5,492,016 A | * | 2/1996 | Pinto et al. ............... 73/724 |
| 5,581,226 A | * | 12/1996 | Shah ..................... 338/42 |
| 5,965,821 A | * | 10/1999 | Grudzien .................. 73/724 |
| 6,151,967 A | * | 11/2000 | McIntosh et al. ......... 73/514.32 |

\* cited by examiner

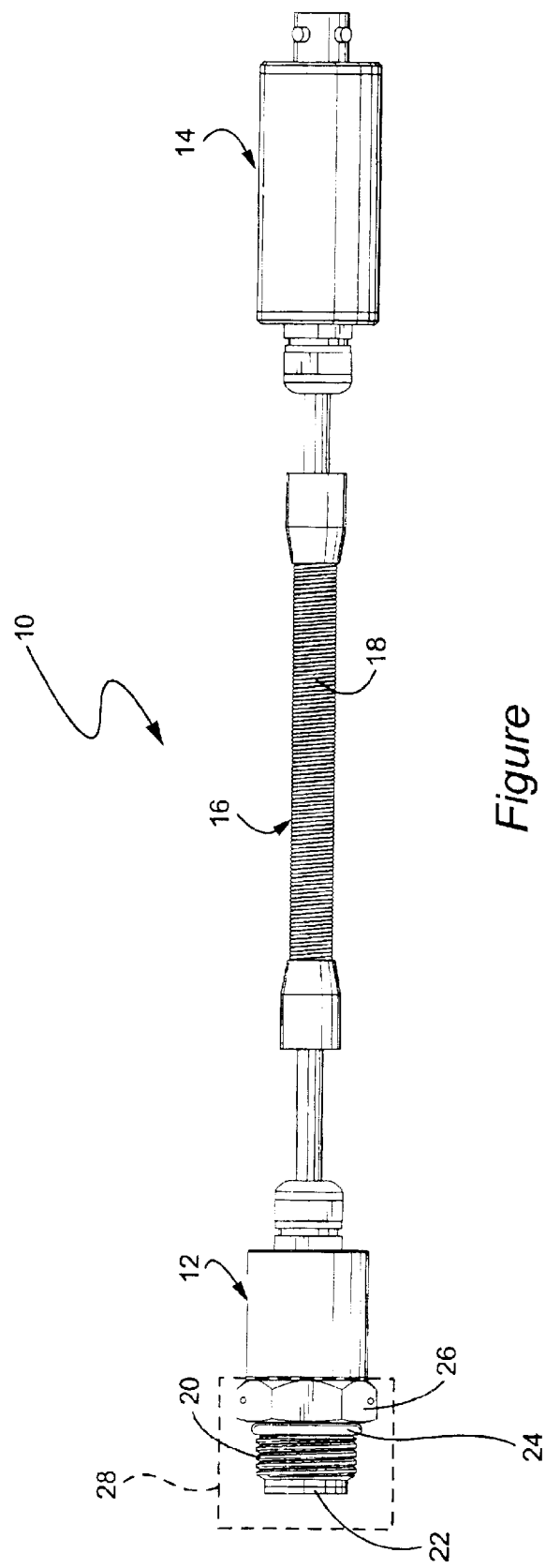
*Figure*

CYLINDER PRESSURE TRANSDUCER AND RELATED METHOD

BACKGROUND OF INVENTION

This invention relates to pressure transducers and, more specifically, to a pressure transducer that can withstand sour gas environments typically experienced with hydrogen reciprocating compressors.

Current pressure transducers used in hydrogen reciprocating compressors have a relatively short life due to chemical attack on the diaphragm as the result to sulfide stress cracking, hydrogen embrittlement and chloride cracking. Typically, the pressure transducers use a 316 L stainless steel diaphragm, the life of which varies with the concentration of the sulfides and chlorides present in the gas stream. Diaphragm failure frequently occurs in less than one year of service and in some cases less than two months of service. Customer expectations, on the other hand, are in the three to five year range and therefore, it would be desirable to provide a pressure transducer with an increased life expectancy and particularly in sour gas environments typically found with hydrogen reciprocating compressors.

SUMMARY OF INVENTION

In accordance with an exemplary embodiment of this invention, a piezo-resistive pressure transducer utilizes a diaphragm constructed of a nickel-based alloy known as C-276, with a noble metal plating, e.g., 24K gold plating. The C-276 alloy material is also employed for all exterior wetted surfaces on the pressure transducer. In manufacturing the device, welding to assemble all of the wetted components is achieved without filler material, and the gold plating of the diaphragm is done after welding.

It is expected that the pressure transducer as described above will last up to five years (approximately 1 billion cycles) in hydrogen reciprocating compressors with sulfides and chlorides present in the gas stream. In other words, by utilizing these materials, chemical attack on the diaphragm will be greatly reduced, resulting in significant life extension.

Accordingly, in its broader aspects, the present invention relates to a pressure transducer for a hydrogen reciprocating compressor in a sour gas environment comprising a sensor head including a diaphragm mounted on a free end of the sensor head; wherein the diaphragm is constructed of a nickel-based alloy with gold plating on an exposed side thereof.

In another aspect, the invention relates to a pressure transducer for a hydrogen reciprocating compressor in a sour gas environment comprising a sensor head including a diaphragm mounted on a free end of the sensor head; wherein the diaphragm is constructed of a C-276 nickel-based alloy with gold plating on an exposed side thereof; and wherein the sensor head includes a threaded end portion and an integral hex nut that are also constructed of C-276 nickel-based alloy.

In still another aspect, the invention relates to a method of monitoring line pressure in a reciprocating hydrogen compressor in a sour gas environment comprising a) providing a pressure transducer having a sensor head and a diaphragm located flush with a free end of the sensor head composed of a nickel-based alloy; b) applying gold plating to one side of the diaphragm; and c) mounting the pressure transducer in a reciprocating compressor with the one side exposed to the sour gas.

The invention will now be described in connection with the single drawing figures identified below.

BRIEF DESCRIPTION OF DRAWINGS

The FIGURE is a side elevation of a cylinder pressure transducer in accordance with an exemplary embodiment of the invention.

DETAILED DESCRIPTION

With reference to the single drawing FIGURE, a cylinder pressure transducer 10 of the piezo-resistive type that includes a sensor head 12 at one end thereof, and a housing 14 at an opposite end, connected by a transducer cable 16. The electronics of the device have been relocated from the sensor head 12 to the housing 14 to achieve better temperature performance. The cable 16 may be wrapped or enclosed in any suitable armor 18 if desired. The sensor head 12 includes a threaded end portion 20 having a flush-mounted diaphragm 22 at the free end thereof. An O-ring 24 is located between the threaded end portion 20 and an integral hex nut 26 by which the transducer is threadably engaged in, for example, a correspondingly threaded aperture in a reciprocating compressor housing (not shown). The sensor head 12 lies axially adjacent the hex nut 22 in a direction toward the housing 14.

This invention is concerned primarily with the diaphragm 22 and the so-called "wetted surfaces" within the phantom box 28 including the threaded portion 20 and hex nut 26.

In accordance with an exemplary embodiment of this invention, the diaphragm 22 is constructed of a C-276 nickel-based alloy that is particularly effective in sour gas environments. One suitable C-276 alloy is available under the name Hastelloy C-276. Typically, the diaphragm may have a thickness of about 42 microns. Preferably, the diaphragm 22 is noble metal plated (preferably gold plating and more preferably 24K gold plating) on its exposed side to provide additional protection to the diaphragm against corrosion and hydrogen diffusion. The preferred thickness of the gold plating is from 5 to 8 microns. The Hastelloy C-276 material is utilized for all of the wetted surfaces inside the phantom box 24, including the threaded end portion 20 and integral hex nut 26. Any welding needed for assembly in this area of the transducer will be achieved without the use of filler. In addition, gold plating of the diaphragm takes place only after all welding has been completed.

It is expected that the transducer as described will last as long as two years (i.e., approximately one billion cycles in $H_2$ reciprocating compressors with both sulfides and chlorides present in the gas stream, thus providing a significantly increased life expectancy for the transducer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure transducer for a hydrogen reciprocating compressor in a sour gas environment comprising a sensor head including a diaphragm mounted on a free end of said sensor head;

wherein said diaphragm is constructed of a nickel-based alloy with a noble metal plating on an exposed side thereof.

2. The pressure transducer of claim 1 wherein said nickel-based alloy is a C-276 alloy.

3. The pressure transducer of claim 1 wherein said sensor head includes a threaded end portion and an integral hex nut that are comprised of said nickel-based alloy.

4. The pressure transducer of claim 3 wherein said nickel-based alloy is a C-276 alloy.

5. The pressure transducer of claim 1 wherein said noble metal plating comprises 24K gold plating.

6. The pressure transducer of claim 1 wherein said gold plating is applied to a thickness of about 5–8 microns.

7. The pressure transducer of claim 1 wherein said diaphragm has a thickness of about 42 microns.

8. The pressure transducer of claim 7 wherein said gold plating is applied to a thickness of about 5–8 microns.

9. A pressure transducer for a hydrogen reciprocating compressor in a sour gas environment comprising a sensor head including a diaphragm mounted on a free end of said sensor head;

wherein said diaphragm is constructed of a nickel-based alloy with a noble metal plating on an exposed side thereof;

and further comprising a housing connected to said sensor head by a transducer cable.

10. The pressure transducer of claim 9 wherein said transducer cable is enclosed in armor.

11. A pressure transducer for a hydrogen reciprocating compressor in a sour gas environment comprising a sensor head including a diaphragm mounted on a free end of said sensor head;

wherein said diaphragm is constructed of a nickel-based C-276 alloy with gold plating on an exposed side thereof; and wherein said sensor head includes a threaded end portion and an integral hex nut that are also constructed of said nickel-based C-276 alloy.

12. A method of monitoring line pressure in a reciprocating hydrogen compressor in a sour gas environment comprising:

a) providing a pressure transducer having a sensor head and a diaphragm located flush with a free end of said sensor head composed of a nickel-based alloy;

b) applying gold plating to one side of said diaphragm; and c) mounting said pressure transducer in a reciprocating compressor with said one side exposed to the sour gas.

13. The method of claim 12 wherein said nickel-based alloy comprises a C-276 alloy.

14. The method of claim 12 wherein said gold plating comprises 24K gold plating.

15. The method of claim 12 wherein said gold plating is applied to a thickness of about 5–8 microns.

16. The method of claim 12 wherein said diaphragm has a thickness of about 42 microns and said gold plating is applied to a thickness of about 5–8 microns.

17. The method of claim 12 wherein said sensor head includes a threaded end portion and an integral hex nut comprised of said C-276 alloy.

* * * * *